(12) United States Patent
Poon et al.

(10) Patent No.: US 7,424,217 B2
(45) Date of Patent: Sep. 9, 2008

(54) METHOD OF EVALUATING IMAGE INFORMATION, PHOTOGRAPHING DEVICE, AND STORAGE MEDIUM HAVING PROGRAM STORED THEREON

(75) Inventors: Eunice Poon, Ontario (CA); Megumi Kanda, Tokyo (JP); Ian Clarke, Ontario (CA)

(73) Assignee: Seiko Epson Corporation, Tokyo (JP)

( * ) Notice: Subject to any disclaimer, the term of this patent is extended or adjusted under 35 U.S.C. 154(b) by 352 days.

(21) Appl. No.: 11/223,980

(22) Filed: Sep. 13, 2005

(65) Prior Publication Data
US 2006/0056835 A1 Mar. 16, 2006

(30) Foreign Application Priority Data
Sep. 14, 2004 (JP) ............................. 2004-266984
Mar. 2, 2005 (JP) ............................. 2005-057449

(51) Int. Cl.
G03B 17/18 (2006.01)
G03B 17/20 (2006.01)
G03B 7/02 (2006.01)
G03B 13/00 (2006.01)
G03B 13/02 (2006.01)
G03B 13/16 (2006.01)
G03B 13/18 (2006.01)

(52) U.S. Cl. ............... 396/310; 396/281; 396/287; 396/290; 396/296; 396/373; 396/374; 348/333.01; 348/333.02; 348/333.03; 348/333.04; 348/333.05; 348/333.11; 348/333.12; 348/346

(58) Field of Classification Search ............... 396/310, 396/287, 374, 296, 147, 290, 281, 373; 348/333.01–333.05, 333.11, 333.12, 346
See application file for complete search history.

(56) References Cited

U.S. PATENT DOCUMENTS

| 4,575,212 | A  | * | 3/1986  | Kitaura et al.  | 396/102 |
| 4,599,653 | A  | * | 7/1986  | Kimura et al.   | 348/346 |
| 5,225,940 | A  | * | 7/1993  | Ishii et al.    | 359/823 |
| 5,710,954 | A  | * | 1/1998  | Inoue           | 396/374 |
| 6,370,330 | B2 | * | 4/2002  | Sekine et al.   | 396/54  |
| 7,038,724 | B2 | * | 5/2006  | Satoh et al.    | 348/333.05 |
| 7,271,838 | B2 | * | 9/2007  | Suekane et al.  | 348/333.02 |
| 7,286,177 | B2 | * | 10/2007 | Cooper          | 348/333.02 |
| 7,324,151 | B2 | * | 1/2008  | Onozawa         | 348/346 |
| 7,356,254 | B2 | * | 4/2008  | Aoyama          | 396/147 |
| 7,362,354 | B2 | * | 4/2008  | Lin             | 348/222.1 |
| 2003/0071908 | A1 | * | 4/2003 | Sannoh et al.  | 348/345 |
| 2003/0151674 | A1 | * | 8/2003 | Lin             | 348/222.1 |

(Continued)

FOREIGN PATENT DOCUMENTS

JP 11-88810 A 3/1999

*Primary Examiner*—W. B. Perkey
*Assistant Examiner*—Anthony Weathers
(74) *Attorney, Agent, or Firm*—Sughrue Mion, PLLC

(57) ABSTRACT

An evaluation on image information is indicated before operating a shutter operating section. For example, a method of evaluating image information includes: (a) a step of converting an optical image of an object to be photographed into electrical image information; (b) a step of evaluating the image information that has not yet been stored in a non-volatile memory, wherein the image information is evaluated in a state in which a shutter operating section, on which a predetermined operation is performed when storing the image information in the non-volatile memory, is not being subjected to the predetermined operation; and (c) a step of outputting an evaluation result.

18 Claims, 10 Drawing Sheets

U.S. PATENT DOCUMENTS

2003/0174230 A1* 9/2003 Ide et al. .................... 348/345
2004/0263652 A1* 12/2004 Oda .......................... 348/272
2005/0012832 A1* 1/2005 Yano ......................... 348/234
2005/0275737 A1* 12/2005 Cheng ..................... 348/333.02

* cited by examiner

| -1 | 0 | 1 |
|----|---|---|
| -2 | 0 | 2 |
| -1 | 0 | 1 |
Fig.7A
| -1 | -2 | -1 |
|----|----|----|
| 0  | 0  | 0  |
| 1  | 2  | 1  |
Fig.7B
| P(i-1, j-1)<br>Y(i-1, j-1) | P(i, j-1)<br>Y(i, j-1) | P(i+1, j-1)<br>Y(i+1, j-1) |
|---|---|---|
| P(i-1, j)<br>Y(i-1, j) | P(i, j)<br>Y(i, j) | P(i+1, j)<br>Y(i+1, j) |
| P(i-1, j+1)<br>Y(i-1, j+1) | P(i, j+1)<br>Y(i, j+1) | P(i+1, j+1)<br>Y(i+1, j+1) |
Fig.7C
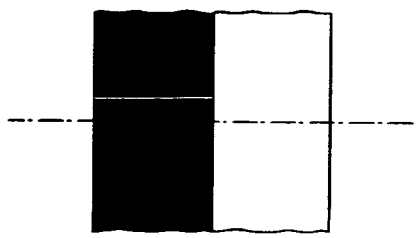
Fig.8A
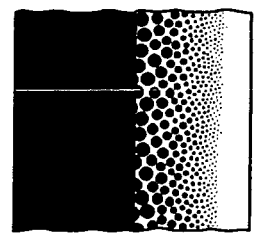
Fig.8C
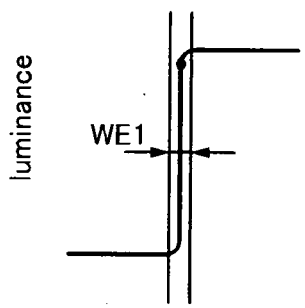
Fig.8B
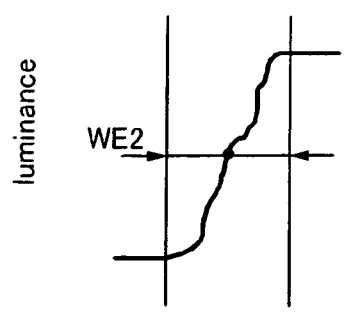
Fig.8D

METHOD OF EVALUATING IMAGE INFORMATION, PHOTOGRAPHING DEVICE, AND STORAGE MEDIUM HAVING PROGRAM STORED THEREON

CROSS-REFERENCE TO RELATED APPLICATIONS

The present application claims priority upon Japanese Patent Application No. 2004-266984 filed on Sep. 14, 2004 and Japanese Patent Application No. 2005-57449 filed on Mar. 2, 2005, which are herein incorporated by reference.

BACKGROUND OF THE INVENTION

1. Field of the Invention

The present invention relates to a method of evaluating image information, a photographing device, and a storage medium having a program stored thereon.

2. Description of the Related Art

Examples of photographing devices, in which an optical image of an object to be photographed (captured object) is converted into electrical image information and then is stored in a non-volatile memory, include digital cameras. Furthermore, recent portable telephones and PDAs (personal digital assistants) also have a function of storing image information in a non-volatile memory in a similar manner to that of digital cameras. Some photographing devices of this type notify an evaluation on a photographed image. For example, some devices notify a possibility of blurring due to hand movement at the time of photographing (see JP-A-11-88810, for example). These photographing devices have a vibration detecting device for detecting vibrations in the vertical direction and the horizontal direction, and notify information relating to blurring due to hand movement based on the correlations between the output from the vibration detecting device and the shutter speed at the time of operating a shutter operating section (photographing button).

The above-described photographing devices acquire the output from the vibration detecting device when the shutter operating section is operated. Thus, information relating to blurring due to hand movement is not notified to a photographer until the shutter operating section is operated. Furthermore, the information relating to blurring due to hand movement that is notified to a photographer is an estimation based on the correlations between the output from the vibration detecting device and the shutter speed. Accordingly, there is a possibility that the information relating to blurring due to hand movement is different from obtained image information.

SUMMARY OF THE INVENTION

The present invention was arrived at in view of such problems, and it is an object thereof to realize a method of evaluating image information, a photographing device, and a storage medium having a program stored thereon, in which an evaluation on image information can be indicated before operating a shutter operating section.

A primary aspect of the present invention for achieving the foregoing object is a method of evaluating image information as follows.

That is, a method of evaluating image information includes:

(a) a step of converting an optical image of an object to be photographed into electrical image information;

(b) a step of evaluating the image information that has not yet been stored in a non-volatile memory, wherein the image information is evaluated in a state in which a shutter operating section, on which a predetermined operation is performed when storing the image information in the non-volatile memory, is not being subjected to the predetermined operation; and (c) a step of outputting an evaluation result.

Features and objects of the present invention other than the above will become clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings.

FIG. 7A is a diagram explaining a Sobel filter in the X-direction used for creating an edge image.

FIG. 7B is a diagram explaining a Sobel filter in the Y-direction used for creating an edge image.

FIG. 7C is a schematic diagram explaining the luminance in 3×3 pixels with the center on one pixel P.

FIG. 8A is a schematic diagram explaining a sharp edge image.

FIG. 8B is a graph of the luminance corresponding to the edge in FIG. 8A.

FIG. 8C is a schematic diagram explaining a blurred edge image.

FIG. 8D is a graph of the luminance corresponding to the edge in FIG. 8C.

DETAILED DESCRIPTION OF PREFERRED EMBODIMENTS

Figure 1A:
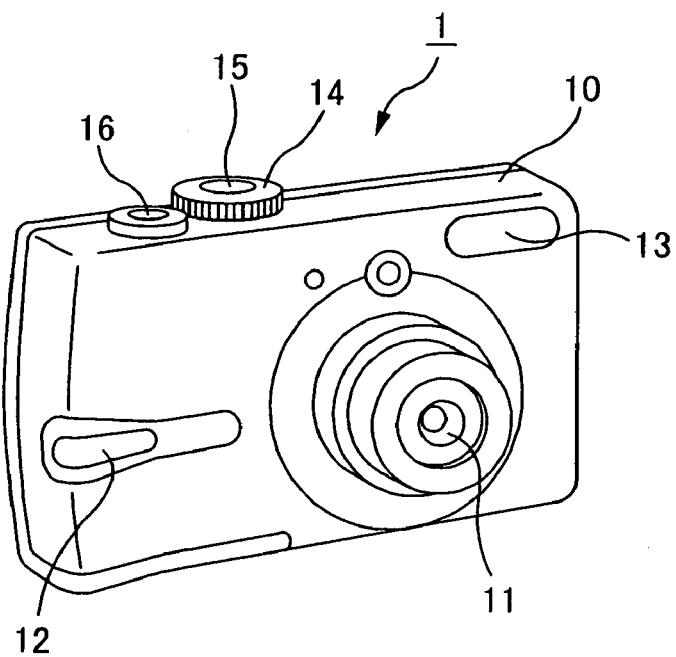
FIG. 1A is a perspective view showing the appearance of a digital camera.

At least the following matters will be made clear by the explanation in the present specification and the description of the accompanying drawings.

That is, it is possible to achieve a method of evaluating image information including:

(a) a step of converting an optical image of an object to be photographed into electrical image information;

(b) a step of evaluating the image information that has not yet been stored in a non-volatile memory, wherein the image information is evaluated in a state in which a shutter operating section, on which a predetermined operation is performed when storing the image information in the non-volatile memory, is not being subjected to the predetermined operation; and (c) a step of outputting an evaluation result.

With this method of evaluating image information, converted image information is evaluated before being stored in a non-volatile memory, and thus a photographer can confirm an evaluation on the image information before operating the shutter operating section. Furthermore, the image information targeted for evaluation is image information after being converted from an optical image, and thus it is possible to precisely perform an evaluation.

In this method of evaluating image information, it is preferable that the method further includes a step of storing the evaluation result in the non-volatile memory, and that the evaluation result is stored in the non-volatile memory in a state associated with the image information.

With this method of evaluating image information, an evaluation result is stored in a non-volatile memory in a state associated with the image information. Thus, it is possible to improve the usability when using the stored image information. For example, it is possible to improve the usability when correcting the stored image information or when printing the stored image information with a printing apparatus.

In this method of evaluating image information, it is preferable that the evaluation result is associated with the image information by being made into additional information in Exif.

With this method of evaluating image information, an evaluation result is made as additional information in Exif, and thus it is possible to effectively perform post-processing based on the evaluation.

In this method of evaluating image information, it is preferable that the method further includes a step of displaying the evaluation result on an image display section, and that the evaluation result is displayed on the image display section together with a preview image based on the image information that has not yet been stored in the non-volatile memory.

With this method of evaluating image information, it is possible to let both the preview image and the evaluation result be seen easily.

In this method of evaluating image information, it is preferable that the evaluation result is periodically displayed in a period that is longer than an update period in which the preview image is updated.

With this method of evaluating image information, it is possible to display an evaluation result in a necessary period.

In this method of evaluating image information, it is preferable that in the step of outputting the evaluation result, the image information is evaluated in terms of a plurality of items, and a combined evaluation result is output based on the evaluation in terms of at least two items.

With this method of evaluating image information, a combined evaluation result based on the evaluation in terms of at least two items is output, and thus it is possible to perform a precise evaluation.

In this method of evaluating image information, it is preferable that in the step of outputting the evaluation result, the combined evaluation result is output based on the evaluation in terms of at least two items that are each weighted.

With this method of evaluating image information, it is possible to perform a more precise evaluation.

In this method of evaluating image information, it is preferable that in the step of outputting the evaluation result, the combined evaluation result is output based on the evaluation in terms of at least two items that are each weighted based on a Gaussian function.

With this method of evaluating image information, it is possible to perform a more precise evaluation.

In this method of evaluating image information, it is preferable that in the step of evaluating the image information that has not yet been stored in the non-volatile memory, the evaluation with respect to the image information is performed with respect to an evaluation range that is defined in a portion of the image information.

With this method of evaluating image information, evaluation of image information is performed with respect to an evaluation range that is defined in a portion of the image information, and thus it is possible to effectively perform an evaluation.

In this method of evaluating image information, it is preferable that the evaluation range is defined based on a range having a largest number of edges, by dividing the image information targeted for evaluation into a plurality of ranges and obtaining the number of edges in each of the divided ranges.

With this method of evaluating image information, an evaluation is performed on a range with the largest number of edges, and thus it is possible to perform a precise evaluation.

In this method of evaluating image information, it is preferable that the method further includes a step of outputting information indicating the evaluation range.

With this method of evaluating image information, it is possible to notify the range targeted for evaluation, and thus the usability can be improved.

In this method of evaluating image information, it is preferable that the method further includes a step of displaying the evaluation range on an image display section, and that the evaluation range is displayed together with a preview image based on the image information that has not yet been stored in the non-volatile memory.

With this method of evaluating image information, it is possible to show the range targeted for evaluation together with the preview image, and thus the usability in photographing can be improved.

In this method of evaluating image information, it is preferable that in the step of evaluating the image information that has not yet been stored in the non-volatile memory, the evaluation is made regarding blurring of the image information due to hand movement.

With this method of evaluating image information, an evaluation is performed in terms of blurring due to hand movement, which has a significant influence on image-information evaluation, and thus it is possible to perform a precise evaluation.

In this method of evaluating image information, it is preferable that in the step of evaluating the image information that has not yet been stored in the non-volatile memory, the evaluation is made regarding blurring of the image information due to the image being out-of-focus.

With this method of evaluating image information, an evaluation is made as to whether the image information is out-of-focus, which has a significant influence on image-information evaluation, and thus it is possible to perform a precise evaluation.

In this method of evaluating image information, it is preferable that the method further includes step of storing the image information in the non-volatile memory, and that the image information is stored in the non-volatile memory under a condition that the predetermined operation has been performed on the shutter operating section.

With this method of evaluating image information, it is possible to store the image information targeted for evaluation in a non-volatile memory.

In this method of evaluating image information, it is preferable that in the step of storing the image information in the non-volatile memory, the image information is stored in the non-volatile memory under a condition that an evaluation regarding blurring of the image information due to hand movement is equal to or better than a predetermined criterion.

With this method of evaluating image information, it is possible to prevent a trouble that blurred image information is stored.

In this method of evaluating image information, it is preferable that the predetermined operation on the shutter operating section is an operation of pressing the shutter operating section to a deepest point.

With this method of evaluating image information, it is possible to perform an operation that is different from an operation of storing image information, by pressing the shutter operating section halfway in the depth direction.

In this method of evaluating image information, it is preferable that in the step of evaluating the image information that has not yet been stored in the non-volatile memory, the image information is evaluated in a state in which the shutter operating section is pressed halfway in a depth direction.

It is also possible to achieve a photographing device, including:

an optical/electrical converting section that converts an optical image of an object to be photographed into electrical image information;

a shutter operating section on which a predetermined operation is performed when storing the image information in a non-volatile memory; and a controller that evaluates the image information that has not yet been stored in the non-volatile memory in a state in which the predetermined operation is not being performed on the shutter operating section, and that outputs an evaluation result.

It is also possible to achieve a storage medium having a program stored thereon, the program including:

a code that causes a photographing device to perform a process of converting an optical image of an object to be photographed into electrical image information;

a code that causes the photographing device to evaluate the image information that has not yet been stored in a non-volatile memory in a state in which a shutter operating section, on which a predetermined operation is performed when storing the image information in the non-volatile memory, is not being subjected to the predetermined operation; and a code that causes the photographing device to perform a process of outputting an evaluation result.

First Embodiment

<Regarding the Appearance of Digital Camera 1>

Figure 1B:
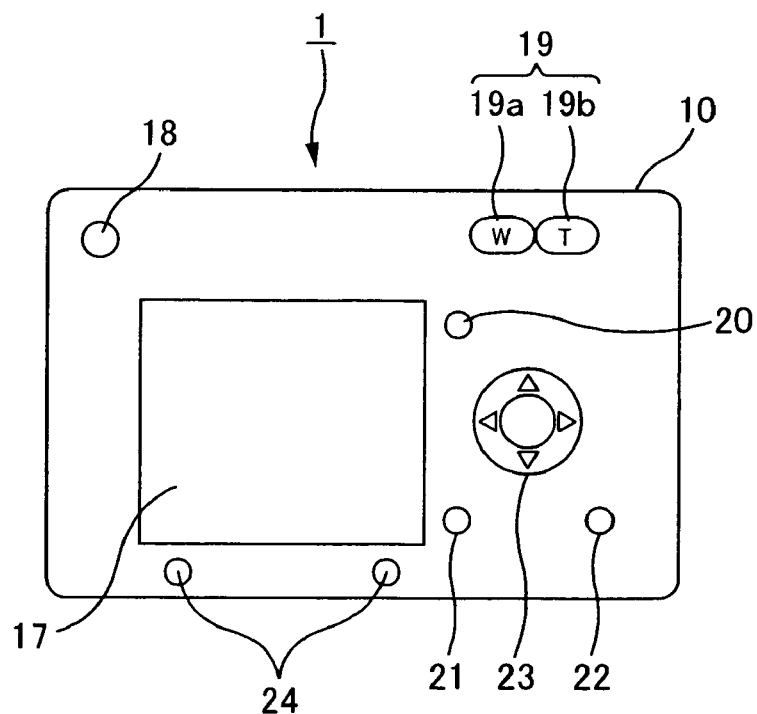
FIG. 1B is a rear view of the digital camera.
Figure 2:
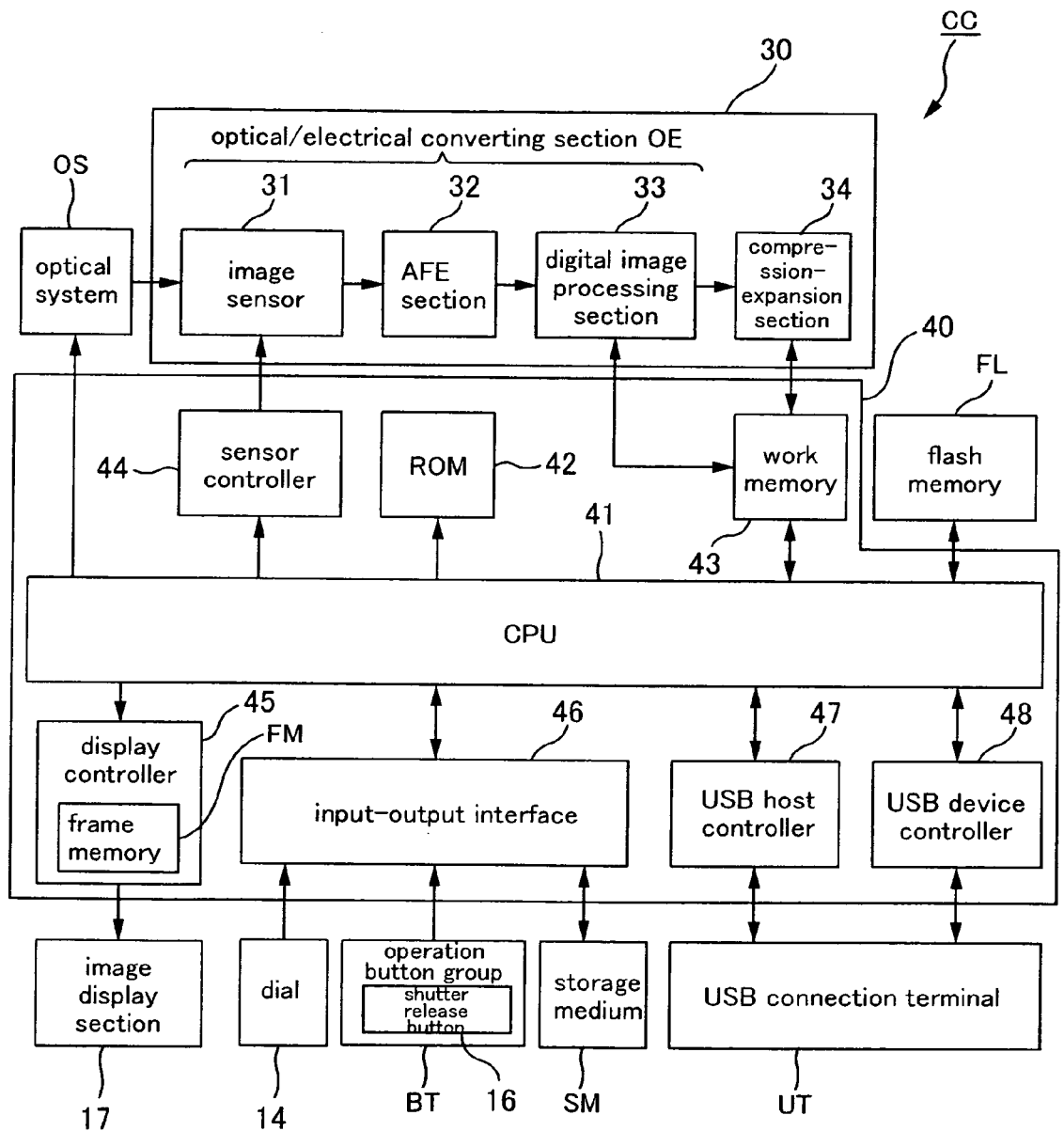
FIG. 2 is a block diagram explaining a control system of the digital camera.

Firstly, the appearance of a digital camera 1, which is one type of photographing device, is described. Herein, FIG. 1A is a perspective view showing the appearance of the digital camera 1. FIG. 1B is a rear view of the digital camera 1. FIG. 2 is a block diagram explaining a control system CC of the digital camera 1.

The digital camera 1 shown in FIG. 1A and FIG. 1B has a box-shaped housing 10 for containing components constituting the control system CC in its inner portion. A lens 11, a self-timer lamp section 12, and a strobe light 13 are arranged on the front face of the housing 10. In this digital camera 1, the lens 11 is a zoom lens whose focal distance can be changed. Thus, the digital camera 1 has a zoom driving section (not shown) for changing the focal distance of the lens 11. Furthermore, a diaphragm and a shutter (neither are shown) are also arranged in accordance with the lens 11. The lens 11, the zoom driving section, the diaphragm, and the shutter constitute an optical system OS (see FIG. 2). The self-timer lamp section 12 indicates that the self-timer is in operation. This self-timer lamp section 12 is constituted with, for example, an LED (light emitting diode), and flashes to indicate that the self-timer is in operation. The strobe light 13 is a light source used in a dark place or in backlight, for example.

A mode dial 14, a power button 15, and a shutter release button 16 are arranged on the upper face of the housing 10. The mode dial 14 is operated when selecting a mode (photographing mode, for example) in the digital camera 1. The mode dial 14 is constituted with a dial-type changeover switch. The power button 15 is operated when turning the power of the digital camera 1 on and off. The power button 15 shown as an example is a push button that operates when pressed, and is disposed in the center portion in the rotation direction of the mode dial 14.

The shutter release button 16 is a button operated by a photographer in order to store image information. That is to say, when a predetermined operation is performed on this shutter release button 16, image information at the time point of the operation is stored on a storage medium SM or a flash memory FL (see FIG. 2). Thus, the shutter release button 16 corresponds to the shutter operating section. Furthermore, the shutter release button 16 shown as an example is a push button, and the image information is stored on the storage medium SM when the shutter release button 16 is pressed to the deepest point. Thus, an operation of pressing this shutter release button 16 to the deepest point corresponds to the "predetermined operation". Furthermore, in a state in which the shutter release button 16 is pressed halfway in the depth direction (so-called half-pressing state), an operation that is different from the operation of storing image information on the storage medium SM can be performed. For example, it is possible to perform focusing or to set exposure conditions (shutter speed and aperture opening) in the half-pressing state.

The storage medium SM is a non-volatile memory that can be removed from the digital camera 1, and the flash memory FL is a non-volatile memory that is built-in in the digital camera 1. The storage medium SM and the flash memory FL both have the same function for letting image information be stored. Thus, the following is an explanation on a case in which image information is stored on the storage medium SM.

An image display section 17 and various buttons are arranged on the rear face of the housing 10. The image display section 17 is constituted with, for example, a liquid crystal display. Various images are displayed on the image display section 17. For example, a preview image based on image information of a captured object is displayed during a photographing mode in which image information can be stored on the storage medium SM. Herein, the image information of a captured object refers to electrical information that has been converted by an optical/electrical converting section OE (see FIG. 2). Furthermore, immediately after the shutter release button 16 is pressed and image information is stored on the storage medium SM, a confirmation image based on the stored image information is displayed on the image display section 17. In addition, a designated image based on designated image information is displayed on the image display section 17 in a review mode in which image information that has been stored on the storage medium SM is displayed. Other than the above, a setting menu is displayed on the image display section 17 in a setting mode in which various settings for the digital camera 1 are performed.

Examples of the buttons described above include a printing button 18, a zoom button 19, a menu button 20, a display button 21, a review button 22, a four-direction button 23, and a select button 24. Then, these buttons, the power button 15 and the shutter release button 16 described above constitute an operation button group BT (see FIG. 2).

The printing button 18 is used when letting a printing apparatus, such as a printer, print the image information stored on the storage medium SM. The zoom button 19 is used for driving the zoom driving section, and is constituted with a W button 19a that is operated when driving the zoom driving section to the wide-angle side and a T button 19b that is operated when driving the zoom driving section to the telescopic side. The menu button 20 is operated when displaying various menus. The display button 21 is operated when switching display and non-display of the image display section 17. The review button 22 is operated when displaying image information stored on the storage medium SM. The four-direction button 23 and the select button 24 are operated when, for example, selecting, determining, or canceling the menu.

<Regarding the Control System CC of Digital Camera 1>

As shown in FIG. 2, the digital camera 1 has an image creating section 30, a controller 40, and a USB (universal serial bus) connection terminal UT, in addition to the components described above.

The image creating section 30 has an image sensor 31, an analog front end section (AFE section) 32, a digital image processing section 33, and a compression-expansion section 34. The image sensor 31 has a large number of cells in accordance with the number of pixels, and outputs an electrical signal in accordance with the exposure amount for each cell. A CCD (charge-coupled device) or a CMOS (complementary metal-oxide semiconductor), for example, is used for the image sensor 31. The analog front end section 32 quantizes the electrical signals that have been output from the image sensor 31 and thereby converts them into digital signals. The analog front end section 32 performs a gain control and an analog-digital conversion, for example.

The digital image processing section 33 performs an image forming process to create image information from the electrical signals that have been output from the image sensor 31. In the image forming process, for example, electrical signals corresponding to colors R (red), G (green), and B (blue) are obtained, and raw image information is created based on the obtained electrical signals corresponding to the colors. Furthermore, the digital image processing section 33 performs, for example, a white-balance correction, a γ correction, and a color space conversion on the created raw image information, and thereby creates image information (digital image) indicating the gradation values of R, G and B, or the gradation values of Y, Cb and Cr, for example. Herein, in this embodiment, image information constituted by the gradation values of R, G and B is created.

The compression-expansion section 34 compresses the image information that has been created by the digital image processing section 33 and expands the image information that has been compressed (hereinafter, also referred to as "compressed image information"). When compressing image information, for example, a series transformation (discrete cosine transformation or wavelet transformation, for example) and an entropy coding (Huffman coding, for example) are performed on the digital image. On the other hand, when expanding the image information that has been compressed, opposite transformations of these are performed.

In the thus configured image crating section 30, the image sensor 31, the analog front end section 32, and the digital image processing section 33 correspond to the optical/electrical converting section OE in which an optical image of a captured object formed by the optical system OS such as the lens 11 is converted into electrical image information.

The controller 40 has a CPU 41, a ROM 42, a work memory 43, a sensor controller 44, a display controller 45, an input-output interface 46, a USB host controller 47, and a USB device controller 48. The CPU 41 functions as a central processing unit, and performs various control operations in accordance with an operation program stored in the ROM 42. Accordingly, the operation program has codes for realizing the control operations. The operation program and control parameters are stored in the ROM 42. Data is temporarily stored in the work memory 43. In this embodiment, the work memory 43 is accessible from each of the CPU 41, the digital image processing section 33, and the compression-expansion section 34. Thus, the CPU 41 can obtain image information created by the digital image processing section 33 and compressed image information compressed by the compression-expansion section 34 via the work memory 43.

The sensor controller 44 is an operation circuit for operating the above-described image sensor 31. That is to say, the image sensor 31 operates in accordance with control signals from the sensor controller 44. For example, an operation of switching target cells that are to be read out is performed. The display controller 45 lets an image be displayed by operating the image display section 17. A frame memory FM that can store image information for one screen of the image display section 17 is provided for the display controller 45. In the photographing mode, image information DAT (also referred to as "preview image information DAT" for convenience) for a preview image is stored in the frame memory FM. The preview image information DAT is created by the CPU 41, for example, based on image information created by the digital image processing section 33. When the preview image information DAT is stored in the frame memory FM, a preview image is displayed on the image display section 17. Furthermore, when the preview image information DAT that is stored in the frame memory FM is updated in a predetermined update period (1/32 second, for example), the preview image is displayed as a moving image.

The mode dial 14, the operation button group BT, and the storage medium SM described above are electrically connected with the input-output interface 46. The input-output interface 46 receives setting signals from the mode dial 14, and operation signals from the buttons (the power button 15, the shutter release button 16, the printing button 18, the zoom button 19, the menu button 20, the display button 21, the review button 22, the four-direction button 23, and the select button 24) constituting the operation button group BT. Furthermore, the input-output interface 46 stores the compressed image information on the storage medium SM, and reads out the compressed image information that has been stored on the storage medium SM. When storing the compressed image information on the storage medium SM, the CPU 41 gives a file name, serving as identification information, to the compressed image information that has been stored in the work memory 43.

<Outline of the Operation in Photographing>

In the digital camera 1 having the above described configuration, when the photographing mode is selected, the optical/electrical converting section OE converts an optical image of a captured object into electrical image information. Then, a preview image based on the image information of the captured object is displayed on the image display section 17. The preview image is updated in a predetermined update period, and is thus displayed as a moving image. Then, when a desired composition is obtained in the preview image, a photographer presses the shutter release button 16 to the deepest point. Accordingly, image information at the time point of pressing the shutter release button 16 is output from the digital image processing section 33 and is temporarily stored in the work memory 43. The image information that has been stored in the work memory 43 undergoes a compressing process performed by the compression-expansion section 34, and is thus transformed into compressed image information. The compressed image information is also stored temporarily in the work memory 43. Then, the compressed image information that has been stored in the work memory 43 is read out by the CPU 41 and is stored on the storage medium SM.

Outline of the Embodiment

In the digital camera 1 of this type, if it is possible to confirm an evaluation on the image information that has not yet been stored on the storage medium SM, such as an evaluation regarding blurring due to the image being out-of-focus, then failures can be reduced and thus an improved usability can be achieved. With this point in mind, in this embodiment, the controller 40 is led to evaluate the image information that has not yet been stored on the storage medium SM, in a state in which the predetermined operation on the shutter release button 16 has not been performed. The evaluation result is output from the controller 40 and the output evaluation result is displayed on the image display section 17 together with the preview image. With this configuration, even before the predetermined operation on the shutter release button 16 is performed, it is possible to confirm an evaluation on image information that is to be obtained. Then, the image information targeted for evaluation undergoes processes such as compression and then is stored on the storage medium SM when the predetermined operation on the shutter release button 16 is performed. Thus, it is possible to perform an evaluation precisely. Hereinafter, these points are described in detail.

Process in the Photographing Mode

Figure 3:
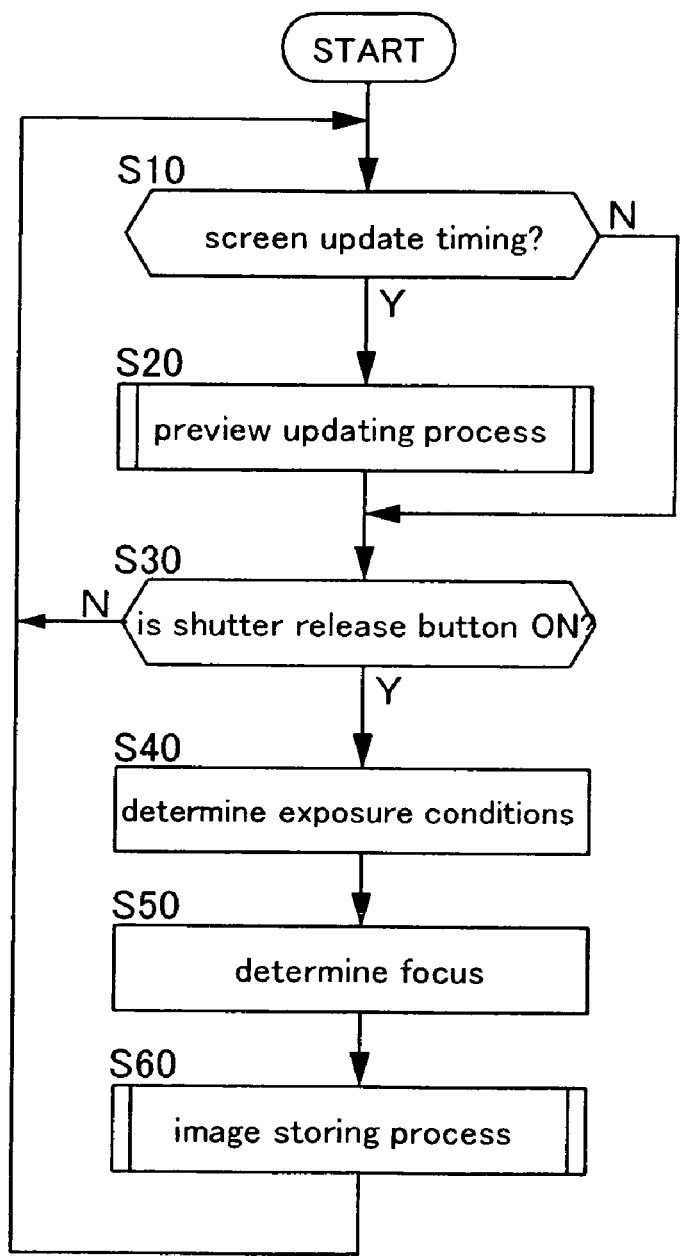
FIG. 3 is a flowchart explaining the process flow in a photographing mode.

First, the process flow in a case in which the photographing mode is selected is described. Herein, FIG. 3 is a flowchart explaining the process flow in the photographing mode. The processes in the photographing mode are performed by the controller 40. More specifically, the processes are performed by the CPU 41 based on the operation program stored in the ROM 42. Accordingly, the operation program has codes for realizing the processes in the photographing mode.

Figure 4:
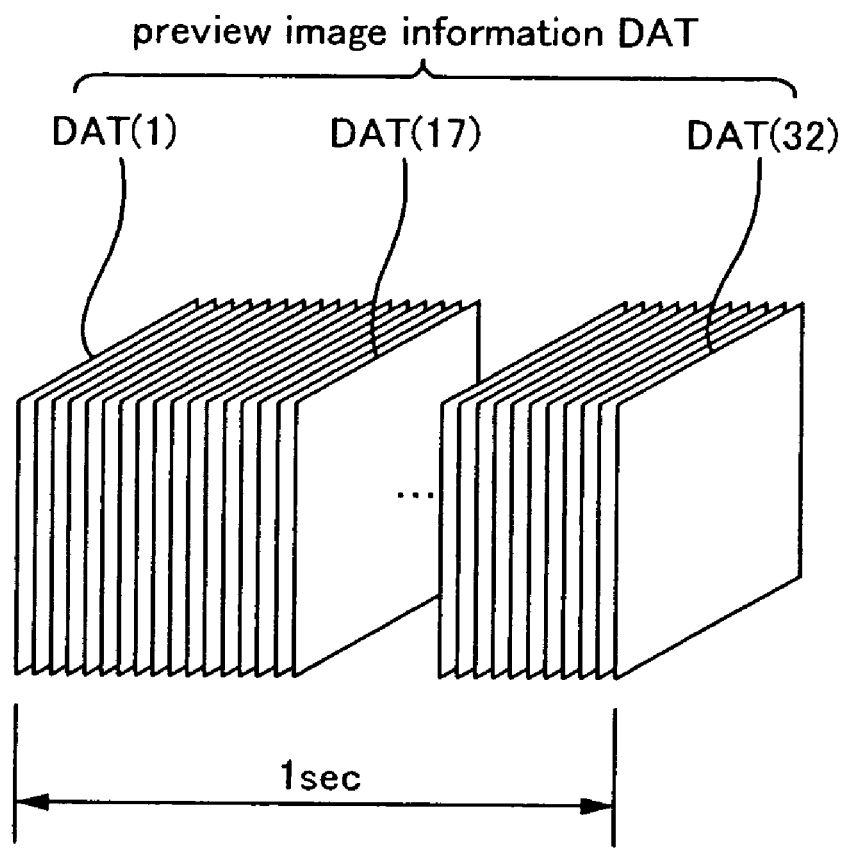
FIG. 4 is a schematic diagram explaining an update period for updating preview image information.

In the processes in the photographing mode, first, it is determined whether or not it is a screen update timing (S10). This screen update timing corresponds to the update timing for updating the preview image information DAT. Herein, FIG. 4 is a schematic diagram explaining an update period for updating the preview image information DAT. As shown in FIG. 4, in this embodiment, the preview image information DAT is updated 32 times per second. Accordingly, in this step, it is determined whether or not $1/32$ second (approximately 0.03 seconds) has passed since the previous update. Herein, if it is determined to be a screen update timing, then the procedure proceeds to a preview updating process (S20). In the preview updating process, an updating process is performed on the preview image information DAT. Furthermore, the image information is evaluated at a predetermined evaluation timing. The preview updating process will be described later.

Then, if it is determined not to be a screen update timing in step S10 or if the preview updating process in step S20 ends, then it is determined whether or not the shutter release button 16 is on (S30). More specifically, it is determined whether or not the shutter release button 16 has been pressed to the deepest point, that is, whether or not the predetermined operation has been performed. Herein, if it is determined that the shutter release button 16 is not on, the procedure returns to step S10 described above, and it is determined whether or not it is a screen update timing.

On the other hand, if it is determined that the shutter release button 16 is on, that is, if it is determined that the shutter release button 16 has been pressed to the deepest point, then the exposure conditions are determined (S40). More specifically, in this step, the shutter speed and the aperture opening are determined. When the exposure conditions are determined, a focus (focusing) is determined (S50). When the exposure conditions and the focus are determined in this manner, an image storing process is performed (S60). In the image storing process, the obtained image information is compressed and is stored on the storage medium SM. The image storing process will be described later.

Preview Updating Process

Figure 5:
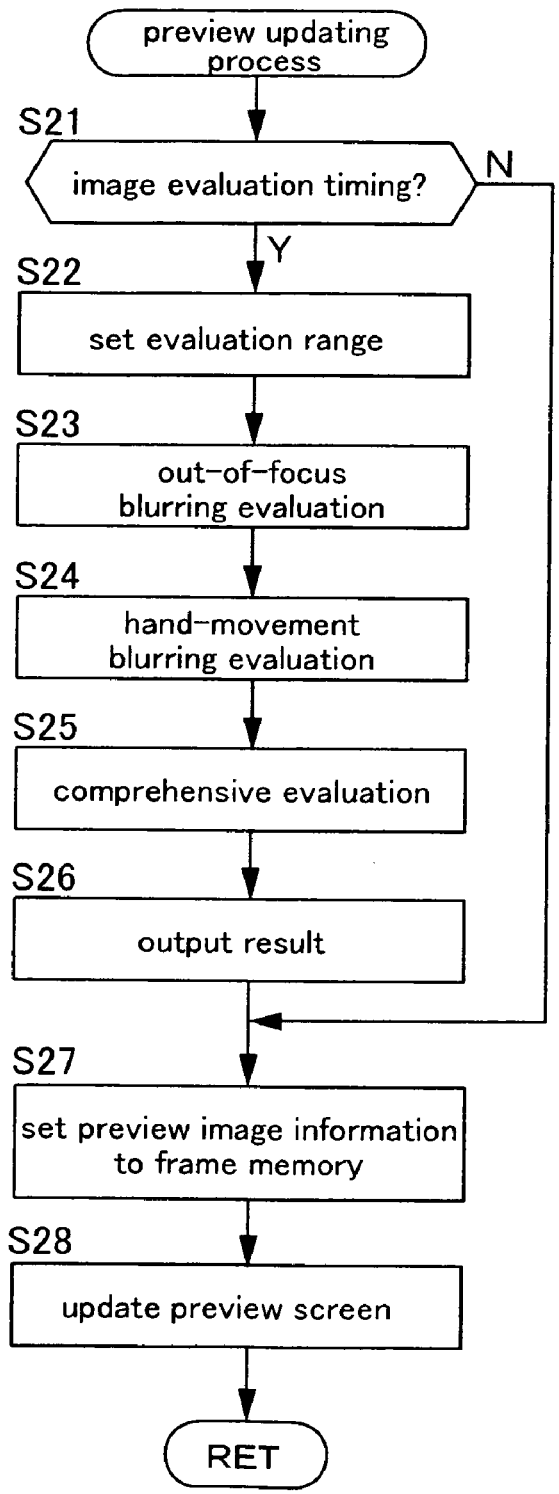
FIG. 5 is a flowchart explaining a preview updating process.

Next, the preview updating process is described. Herein, FIG. 5 is a flowchart explaining the preview updating process. First, the overall procedure of the preview updating process is described. In the preview updating process, the CPU 41 determines whether or not it is an image evaluation timing (S21). If it is determined to be an image evaluation timing, then the CPU 41 performs processes (S22 to S25) relating to an evaluation on image information, and the evaluation result is output (S26). On the other hand, if it is determined not to be an image evaluation timing, then the CPU 41 creates the preview image information DAT and sets the created preview image information DAT to the frame memory FM (S27). When the preview image information DAT is set to the frame memory FM, the preview image is updated (S28).

<Regarding Image Evaluation Timing (S21)>

In this embodiment, image information is evaluated with an interval that is longer than the update interval of the preview image information DAT. For example, while the preview image information DAT is updated at an interval of $1/32$ second, image information is evaluated at an interval of $1/2$ second. Accordingly, in step S21, it is determined whether or not ½ second has passed since the previous evaluation timing. If it is determined that ½ second has passed, then the procedure proceeds to step S22, regarding it as an image evaluation timing. Briefly describing based on the schematic diagram in FIG. 4, while the preview image information DAT is updated 32 times per second, image information is evaluated twice per second. For example, when image information is evaluated at a timing of the preview image information DAT (1), image information is evaluated next at a timing of the preview image information DAT (17).

The evaluation period of image information is set to be longer than the update period of a preview image in this manner, because the usability and the processing efficiency are considered. That is to say, when image information is evaluated in synchronization with the update period of the preview image, the evaluation result is also updated in synchronization with the update period of the preview image. This embodiment has adopted a configuration in which the evaluation result is displayed together with the preview image as described later. Therefore, the photographer may be distracted if the evaluation result changes in a fluctuating manner. Accordingly, in this embodiment, the evaluation period of image information is set to be longer than the update period of a preview image, and in this way, it is possible to display the evaluation result in a necessary period, and thus an improvement in the usability can be achieved. Furthermore, the load on the controller 40 can be reduced.

<Regarding Evaluation on Image Information>

Image information is evaluated by performing processes of an evaluation range setting (S22), an out-of-focus blurring evaluation (S23), a hand-movement blurring evaluation (S24), and a comprehensive evaluation (S25). Hereinafter, the processes are described.

<Regarding Evaluation Range Setting>

Figure 6A:
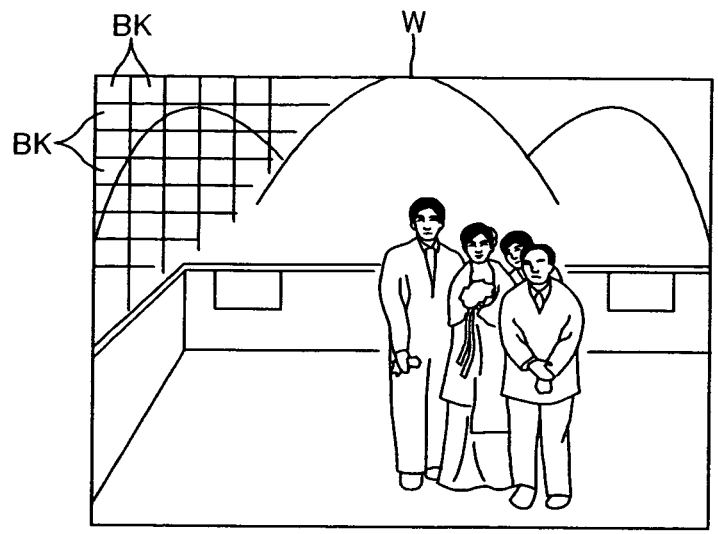
FIG. 6A is a conceptual diagram for explaining image information that has been divided into a predetermined number of blocks.
Figure 6B:
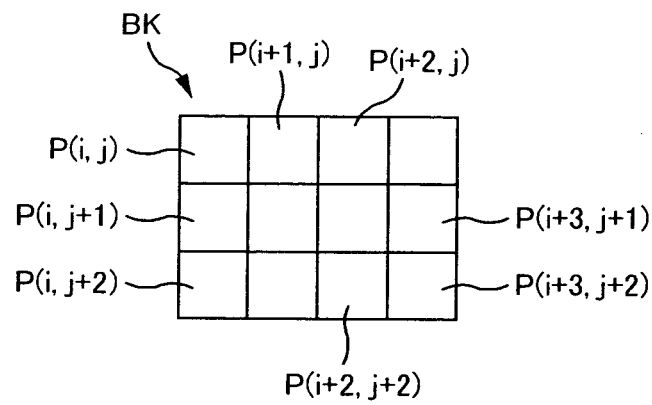
FIG. 6B is a conceptual diagram for explaining the luminance difference between adjacent pixels.
Figure 6C:
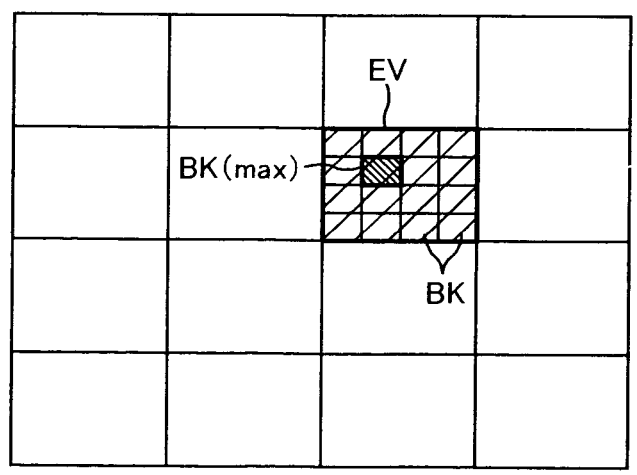
FIG. 6C is a conceptual diagram showing an evaluation range including a block with the largest number of edges.

First, the evaluation range setting (S22) is described. Herein, FIG. 6A is a conceptual diagram for explaining image information that has been divided into a predetermined number of blocks BK. FIG. 6B is a conceptual diagram for explaining the luminance difference between adjacent pixels. FIG. 6C is a conceptual diagram showing an evaluation range EV including a block BK with the largest number of edges. Herein, the evaluation range EV is a target range on which the out-of-focus blurring evaluation (S23) and the hand-movement blurring evaluation (S24) are to be performed. In this embodiment, a portion of an entire range W corresponding to image information is defined as the evaluation range EV. That is to say, the evaluation range EV is set based on the block BK with the largest number of edges.

When setting the evaluation range EV, the CPU 41 creates luminance image information based on image information that is output from the digital image processing section 33. Herein, the luminance image is an image constituted with the luminance (brightness) without including color information, and the luminance image information is information indicating the luminance image. In this embodiment, the Y channel information indicating luminance values is obtained by converting image information (RGB gradation values) that has been created by the digital image processing section 33 into image information that is expressed by the YIQ color space. Then, the luminance image information is created based on the obtained Y channel information.

After creating the luminance image information, the CPU 41 divides the entire range W of the luminance image into a plurality of rectangular blocks BK. In this embodiment, it is divided into 256 blocks BK by uniformly dividing into 16 pieces in the longitudinal direction and into 16 pieces in the width direction as shown in FIG. 6A. Herein, for simplifying the drawing, the blocks BK are shown in only a part of the entire range W in FIG. 6A. After dividing into the blocks BK, the CPU 41 calculates the luminance difference between pixels that are adjacent to each other in the horizontal direction of the luminance image. Then, the absolute values of the luminance differences are summed for each block BK.

For example, it is assumed that one block BK is constituted with 12 pixels from the pixel P(i, j) at the upper left edge to the pixel P(i+3, j+2) at the lower right edge as shown in FIG. 6B. In this case, the CPU 41 subtracts the luminance of the pixel P(i, j) from the luminance of the pixel P(i+1, j) to obtain the luminance difference between these pixels. In a similar manner, the CPU 41 subtracts the luminance of the pixel P(i+1, j) from the luminance of the pixel P(i+2, j) to obtain the luminance difference between these pixels. These calculations are performed in sequence up to a pair of the pixel P(i+3, j+2) and the pixel P(i+2, j+2). Then, the total of the luminance differences in the horizontal direction of the block BK is obtained by summing the absolute values of the luminance differences.

After calculating the total of the luminance differences in the horizontal direction for each block BK, the CPU 41 performs a similar process in the vertical direction of the luminance image. That is to say, the luminance differences between pixels that are adjacent to each other in the vertical direction are calculated, and the absolute values of the luminance differences are summed for each block BK. Describing based on the example in FIG. 6B, the luminance differences between pixels are calculated in sequence from a pair of the pixel P(i, j+1) and the pixel P(i, j) to a pair of the pixel P(i+3, j+2) and the pixel P(i+3, j+1), and then the absolute values of the luminance differences are summed.

After obtaining the total of the luminance differences in the horizontal direction and in the vertical direction for all blocks BK, the total of the luminance difference in the horizontal direction and the total of the luminance difference in the vertical direction are added for each block BK, and the sum total of the luminance differences in the block BK is obtained. Then, the obtained sum total of the luminance differences is compared with one another among the blocks BK, and the block BK with the largest sum total is selected. Herein, the block BK with the largest luminance-difference sum total corresponds to a block BK with the largest luminance difference between pixels that are adjacent to each other in the horizontal direction and between pixels that are adjacent to each other in the vertical direction. In other words, it is considered to be the block BK with the largest number of edges. For example, in the image information in FIG. 6A, it is considered that the luminance difference is largest in the portion including the faces of people. Thus, the block corresponding to the portion including the faces of people is recognized as the block BK(max) with the largest sum total of the luminance differences.

After determining the block BK(max) with the largest sum total of the luminance differences, the CPU 41 sets the evaluation range EV. The evaluation range EV is set at a position in which the block BK(max) with the largest luminance-difference sum total is disposed in the center portion, and is set at a size obtained by reducing the size corresponding to the image information at a predetermined ratio. For example, it is set at a ratio of 0.25 (size obtained by uniformly dividing the size corresponding to the image information into 16 pieces) as shown in FIG. 6C.

<Regarding Out-of-focus Blurring Evaluation>

Next, the out-of-focus blurring evaluation (S23) is described. Herein, FIG. 7A is a diagram explaining a Sobel filter in the X-direction used for creating an edge image. FIG. 7B is a diagram explaining a Sobel filter in the Y-direction used for creating an edge image. FIG. 7C is a schematic diagram explaining a range of 3×3 pixels with the center on one pixel P and luminances Y of the pixels P in this range. FIG. 8A is a schematic diagram explaining a sharp edge image. FIG. 8B is a graph of the luminance corresponding to the edge in FIG. 8A. FIG. 8C is a schematic diagram explaining a blurred edge image. FIG. 8D is a graph of the luminance corresponding to the edge in FIG. 8C.

Blurring due to the image being out-of-focus indicates the degree of focusing. The out-of-focus blurring evaluation is performed based on a width WE of an edge (hereinafter, also referred to as "edge width WE"). That is to say, after obtaining the edge widths WE of the pixels P that have a high possibility to be an edge, an average value (average edge width WEav) of the obtained edge widths WE is calculated. Then, the calculated average edge width WEav is normalized, and this is regarded as an out-of-focus blurring evaluation value. Herein, the out-of-focus blurring evaluation value is constituted with an integer of 0 to 10. For example, the value is closer to "01" as the focusing is shaper, and the value is closer to "10" as the degree of blurring due to the image being out-of-focus is greater.

This out-of-focus blurring evaluation is performed with respect to the image information in the evaluation range EV described above. Thus, the CPU 41 first converts the entire image information (RGB gradation values) that has been created by the digital image processing section 33 into YIQ image information. Then, the CPU 41 sets the evaluation range EV with respect to Y channel information indicating the luminance values, and creates luminance image information of the evaluation range EV. After obtaining the luminance image information of the evaluation range EV, the Sobel filter (FIG. 7A) in the horizontal direction (X-direction) and the Sobel filter (FIG. 7B) in the vertical direction (Y-direction) are applied to the luminance image information. The Sobel filters are matrixes comprising nine (3×3) elements. Edge gradients dx and dy (edge gradient dx in the horizontal direction, and edge gradient dy in the vertical direction) are obtained by applying the Sobel filters. In other words, an image showing pixels P in which the luminance changes significantly in the horizontal direction and an image showing pixels P in which the luminance changes significantly in the vertical direction are obtained. That is, an edge gradient image in the horizontal direction and an edge gradient image in the vertical direction are obtained.

Herein, the application of the Sobel filter is briefly described. For example, the application of the Sobel filter to the pixel P(i, j) shown in FIG. 7C refers to an operation of calculating the products obtained by multiplying the luminance values Y(i−1, j−1) to Y(i+1, j+1) of the 3×3 pixels P that are present in the vicinity of the pixel P with their corresponding elements in the Sobel filter, and then calculating the sum of the nine obtained products. When the Sobel filter in the X-direction is applied to the pixel P(i, j), the edge gradient dx(i, j) as the application result can be expressed based on Equation (1) below.

Equation (1):

$dx(i, j) = [Y(i+1, j-1) + 2 \times Y(i+1, j) + Y(i+1, j+1)] - [Y(i-1, j-1) + 2 \times Y(i-1, j) + Y(i-1, j+1)]$ After obtaining the edge gradients dx and dy, the CPU 41 obtains a gradient magnitude a(i, j) and an edge direction θ(i, j) for each pixel P in the evaluation range EV. Herein, the gradient magnitude a(i, j) corresponds to the degree of being an edge, and is calculated based on Equation (2) below, for example. Furthermore, the edge direction θ(i, j) is a direction that is determined based on the ratio between the luminance gradient dx in the horizontal direction and the luminance gradient dy in the vertical direction. More specifically, it is a direction obtained by adding a vector of the luminance gradient dx and a vector of the luminance gradient dy, and is a direction that is substantially perpendicular to a line constituted with a plurality of edges that are adjacent to each other. Equation (2):

$a(i,j) = \sqrt{dx(i,j) + dy(i,j)^2}$

After obtaining the gradient magnitude a(i, j) and the edge direction θ(i, j), the CPU 41 classifies the pixels P into edges in the horizontal direction and edges in the vertical direction based on the edge direction θ. Then, the edge width WE in the classified direction is calculated. In this embodiment, if the edge direction is close to the horizontal direction, then the edge of the pixel P is classified as the horizontal direction, and if the edge direction is close to the vertical direction, then the edge of the pixel P is classified as the vertical direction. Then, the edge width WE (i, j) is calculated for the classified direction. Herein, the edge width WE(i, j) is set in a range including the target pixel P(i, j), and is the distance (that is, the number of pixels) from the first pixel P at which the luminance value takes the maximal value to the first pixel P at which the luminance value takes the minimal value within this range. For example, since the image in FIG. 8A has a sharp edge, its edge width WE1 is obtained as a sufficiently small value. On the other hand, since the image in FIG. 8C has a blurred edge, its edge width WE2 is obtained as a value that is larger than the edge width WE1.

After obtaining the edge width WE for each pixel P in the evaluation range EV in this manner, the CPU 41 calculates a total edge width WEa (=ΣWE) by summing the obtained edge widths WE. Then, an average edge width WEav (=ΣWEa/Ne) per edge is calculated by dividing the total edge width WEa by the total edge number Ne. Then, an out-of-focus blurring evaluation value of "0" to "10" is obtained based on the calculated average width WEav. For example, a correlation table between the average edge width WEav and the out-of-focus blurring evaluation value is created by determining the maximum value and the minimum value that can be expected with respect to the average edge width WEav and by uniformly dividing the range from the minimum value to the maximum value. This correlation table is stored in, for example, the ROM 42, and an out-of-focus blurring evaluation value is obtained by applying the obtained average edge width WEav to the correlation table.

<Regarding Hand-movement Blurring Evaluation>

Figure 9:
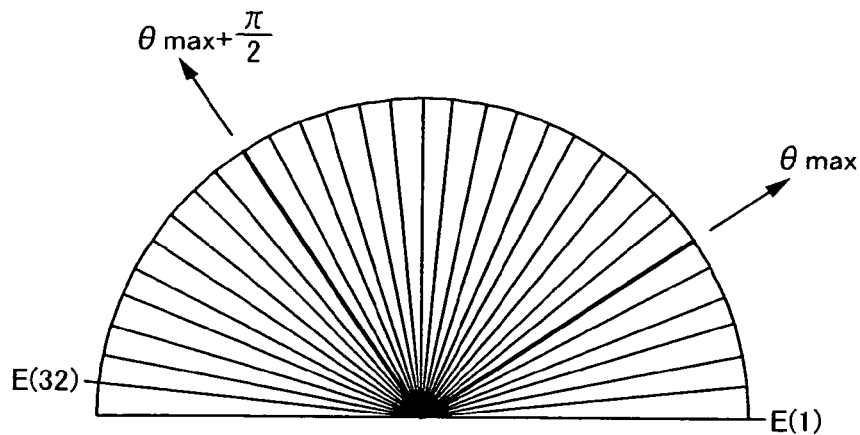
FIG. 9 is a schematic diagram explaining the relationship between an edge strength direction ($\theta$max) and a direction of hand movement ($\theta$max+$\pi$/2).
Figure 10:
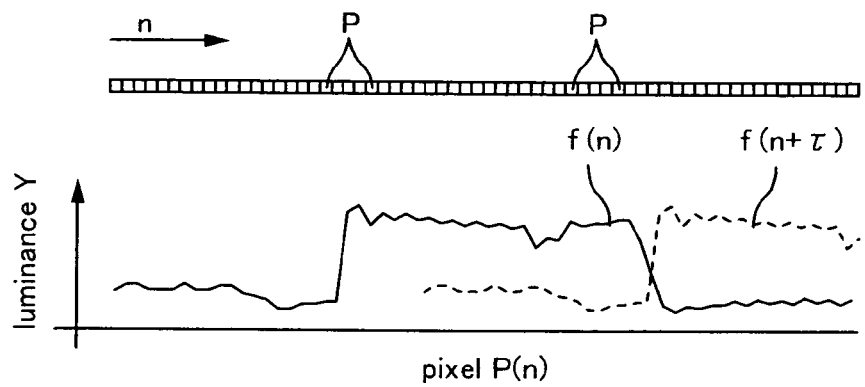
FIG. 10 is a diagram explaining pixels continuously arranged in one direction and a function f(n) obtained based on the luminance corresponding to each pixel.
Figure 11:
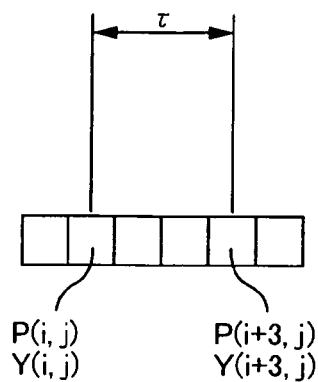
FIG. 11 is a schematic diagram for explaining an autocorrelation function.

Next, the hand-movement blurring evaluation (S24) is described. Herein, FIG. 9 is a schematic diagram explaining the correlations between an edge strength direction (θmax) and a direction of hand movement (θmax+π/2). FIG. 10 is a diagram explaining pixels P continuously arranged in one direction and a function f(n) obtained based on the luminance Y corresponding to each pixel P. FIG. 11 is a schematic diagram for explaining an autocorrelation function.

First, the outline of the hand-movement blurring evaluation is described. Blurring due to hand movement is caused by a camera movement during the exposure, and is a phenomenon in which a captured object is blurred in the camera moving direction. Thus, in the hand-movement blurring evaluation in this embodiment, the degree by which a captured object is blurred is indicated. That is to say, first, the direction of hand movement (θmax+π/2) is calculated, and the function f(n) between the pixel P and the luminance Y is obtained along the calculated direction of hand movement. Then, an autocorrelation function ACFk(τ) shown as Equation (3) below is obtained with respect to the obtained function f (n), and a displacement τ at which the autocorrelation function ACFk(τ) takes the smallest value is taken as the amount of blurring due to hand movement.

$$ACFK(\tau) = \frac{1}{N} \sum_{n=0}^{N-1} f(n) \cdot f(n+\tau)$$

That is to say, when blurring due to hand movement occurs, a point in the captured object is photographed as a line extending across a range corresponding to the amount of blurring due to hand movement. Then, since this line consists of the same point in the captured object, there is a high correlation in terms of color. Thus, the amount of blurring due to hand movement can be obtained by obtaining the function f(n) between the pixel P and the luminance Y in the direction of hand movement, and by calculating the autocorrelation function ACFk(τ) with respect to the obtained function f(n) while displacing the pixel P in the direction of hand movement. More specifically, a displacement τ at which the autocorrelation function ACFk(τ) takes the smallest value is considered to be the amount of blurring due to hand movement. Then, the CPU 41 calculates a hand-movement blurring evaluation value based on the obtained amount of blurring due to hand movement. This hand-movement blurring evaluation value is a normalized value of the amount of blurring due to hand movement. That is to say, the hand-movement blurring evaluation value is obtained by normalizing the amount of blurring due to hand movement. Herein, the hand-movement blurring evaluation value is also constituted with an integer of 0 to 10 in a similar manner to the out-of-focus blurring evaluation value. For example, the value is closer to "0" as the amount of blurring due to hand movement is smaller, and the value is closer to "10" as the amount of blurring due to hand movement is larger.

Hereinafter, the hand-movement blurring evaluation is specifically described. The hand-movement blurring evaluation is also performed based on the luminance in the evaluation range EV described above. Thus, the CPU 41 converts the entire image information (RGB gradation values) into YIQ image information, and creates luminance image information of the evaluation range EV based on the Y channel information. Next, the CPU 41 obtains an edge gradient image dx in the horizontal direction and an edge gradient image dy in the vertical direction by applying the Sobel filter (FIG. 7A) in the horizontal direction and the Sobel filter (FIG. 7B) in the vertical direction to the luminance image information.

After obtaining the edge gradient images dx and dy, the angle at which an edge appears most clearly within the evaluation range EV is determined. Herein, as shown in FIG. 9, the CPU 41 calculates an edge strength E(n) based on Equation (4) below for each determination angle θn(n:1 to 32) in the ½ circle. Equation (4) shows that the edge strength E (n) is indicated as the sum of the absolute values (ABS) of cosθ·dx+ sinθ·dy, and is the sum total of the edge gradients in the direction of the determination angle θn.

Equation 4:

$$E(n) \sum_j \sum_i [ABS(COS\theta n \cdot dx(i,j) + \sin\theta n \cdot dy(i,j))]$$

Then, an angle θmax with the largest edge strength is obtained based on the obtained edge strength E (n). This θmax can be said to be a direction in which the largest number of edges appear. For example, when hand movement occurs during the exposure, edges in the same direction as the hand movement are drifted in the same direction as the hand movement and become blurred. However, edges perpendicular to the direction of hand movement tend to remain as edges even when they are drifted in the same direction as the hand movement. Based on these points, it is understood that the angle θmax with the largest edge strength is in a direction perpendicular to the direction of hand movement. Accordingly, the angle θmax+π/2 that is perpendicular to the angle θmax can be said to be the same angle as the direction of hand movement.

After obtaining the direction of hand movement in this manner, as shown in FIG. 10, the CPU 41 determines pixel groups positioned along the direction of hand movement, and the function f(n) relating to the luminance is determined based on the pixel groups. Next, the CPU 41 obtains an autocorrelation function ACFf(τ), relating to the function f(n) and the function f(n+τ) obtained by shifting the function by the displacement τ, based on Equation (3) described above.

That is to say, the CPU 62 obtains a displacement τ, at which the autocorrelation function ACFf(τ) takes the smallest value, as the amount of blurring due to hand movement. As shown from Equation (3), when the products of the original function f(n) and the function f(n+τ) obtained by shifting the function by the displacement τ are calculated for N pixels (that is, pixels from n=0 to N−1), the autocorrelation function ACFk(τ) is obtained as an average value (1/N) thereof. Herein, when the displacement τ is taken as 0, since the pixels of the function f(n) match the pixels of the function f(n+τ), the autocorrelation function ACFk(τ) takes the highest value. Then, every time the displacement τ increments from 1, 2, ..., the function f(n+) is shifted from the function f(n). Thus, the matching degree between the pixels of the function f(n) and the pixels of the function f(n+τ) is lowered. As a result, every time the displacement τ increments, the autocorrelation function ACFk(τ) takes a smaller value. Then, when the displacement τ corresponding to the amount of blurring due to hand movement is set, the function f(n+τ) does not overlap the function f(n) as shown by the broken line in FIG. 10, and thus the autocorrelation function ACFk(τ) takes the smallest value. When further increasing the displacement τ, there is no correlation between the function f(n) and the function f(n+τ), and thus the autocorrelation function ACFk (τ) takes a value that is larger than the above-described smallest value but is not fixed.

For example, when the blurring due to hand movement for three pixels occurs in the horizontal direction as shown in FIG. 11, the luminance Y of the pixel indicates similar values between a pixel P(i, j) and a pixel P(i+3, j) three pixels away from this pixel. In this case, when the displacement τ is four (pixels), a fluctuating portion of the function f(n) and a fluctuating portion of the function f(n+τ) do not overlap each other, and thus the autocorrelation function ACFf(τ) takes the smallest value. In this manner, it is understood that a displacement τ at which the autocorrelation function ACFf(τ) takes the smallest value indicates the amount of (blurring due to) hand movement.

Furthermore, in order to improve the precision in detecting the amount of blurring due to hand movement, a plurality of sample lines may be determined to obtain the amount of blurring due to hand movement based on the autocorrelation function ACFk(τ) obtained in each sample line. With this procedure, for example, when hand movement occurs along the locus of an arc, it is possible to obtain the amount of blurring due to hand movement with high precision.

When the amount of blurring due to hand movement is obtained in this manner, the CPU 41 obtains a hand-movement blurring evaluation value of "0" to "10" based on the obtained amount of blurring due to hand movement. For example, a correlation table between the amount of blurring due to hand movement and the hand-movement blurring evaluation value is created by determining the maximum value and the minimum value that can be expected with respect to the amount of blurring due to hand movement and by uniformly dividing the range from the minimum value to the maximum value. This correlation table is stored in, for example, the ROM 42, and a hand-movement blurring evaluation value is obtained by applying the obtained amount of blurring due to hand movement to the correlation table.

<Regarding Comprehensive Evaluation>

Figure 12:
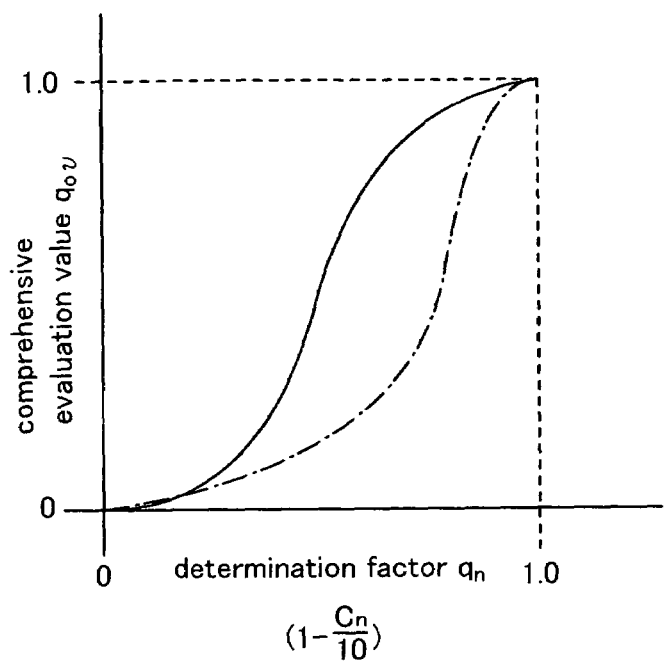
FIG. 12 is a diagram showing the correlations between a determination factor and a comprehensive evaluation value, and is a conceptual diagram showing the difference in weighting.
Figure 13:
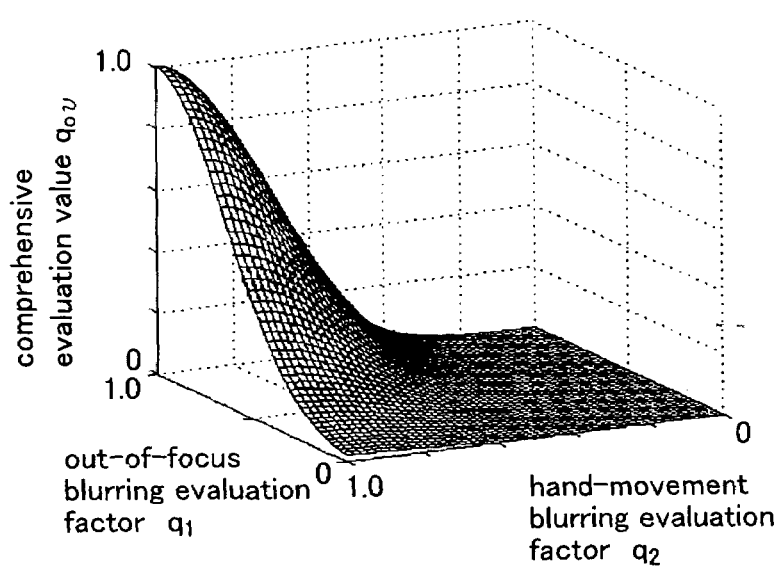
FIG. 13 is a conceptual diagram showing a comprehensive evaluation value that is determined based on an out-of-focus blurring evaluation value and a hand-movement blurring evaluation value.

Next, the comprehensive evaluation (S25) is described. Herein, FIG. 12 is a diagram showing the correlations between a determination factor and a comprehensive evaluation value, and is a conceptual diagram showing the difference in weighting. FIG. 13 is a conceptual diagram showing a comprehensive evaluation value that is determined based on the out-of-focus blurring evaluation value and the hand-movement blurring evaluation value.

The comprehensive evaluation is an evaluation on image information, and a combined evaluation based on evaluation in terms of at least two items. In this comprehensive evaluation, weighting is performed for each item. More specifically, an item weighted more has a more significant effect on the comprehensive evaluation than an item weighted less. In this embodiment, the weighting is performed based on the Gaussian function. The Gaussian function is as shown in Equation (5) below, and generally represents a normal distribution.

Equation (5):

$$q_{ov} = k \prod_{n=1}^{N} \exp\left\{-\frac{q_n^2}{2 \times v_n^2}\right\}$$

Equation (6):

$$q_1 = 1 - \frac{C_1}{10}$$

Equation (7):

$$q_2 = 1 - \frac{C_2}{10}$$

Equation (8):

$$q_{ov} = k \times \exp\left\{-\frac{\left(1-\frac{C_1}{10}\right)^2}{2 \times v_1^2}\right\} \times \exp\left\{-\frac{\left(1-\frac{C_2}{10}\right)^2}{2 \times v_2^2}\right\}$$

In Equation (5), qn refers to a determination factor, and an out-of-focus blurring evaluation factor q1 and a hand-movement blurring evaluation factor q2 correspond to the determination factor. Herein, the determination factor qn is normalized within a range from "0" to "1", and it indicates that the image quality is poorer as the value is closer to "0" and that the image quality is better as the value is closer to "1". Accordingly, as for the out-of-focus blurring evaluation factor q1, it indicates that an image is focused less precisely as the value is closer to "0" and that an image is focused more precisely as the value is closer to "1". In a similar manner, as for the hand-movement blurring evaluation factor q2, it indicates that blurring due to hand movement is greater as the value is closer to "0" and that blurring due to hand movement is smaller as the value is closer to "1". Then, when obtaining the out-of-focus blurring evaluation factor $q_1$ and the hand-movement blurring evaluation factor $q_2$ based on the out-of-focus blurring evaluation value C1 and the hand-movement blurring evaluation value C2 described above, the processes based on Equations (6) and (7) are performed. Based on Equations (6) and (7), Equation (5) can be expressed as Equation (8).

In Equation (5), Vn is a weighting factor. As shown in Equation (8), a weighting factor $V_1$ with respect to the out-of-focus blurring evaluation and a weighting factor $V_2$ with respect to the hand-movement blurring evaluation correspond to the weighting factor Vn, and a value is determined in accordance with each item. In this embodiment, the weighting factor $V_1$ with respect to the out-of-focus blurring evaluation is 0.5, and the weighting factor $V_2$ with respect to the hand-movement blurring evaluation is 0.3. The square of the weighting factor Vn corresponds to a distribution $\sigma^2$ in a normal distribution. Accordingly, the rising is milder as the weighting factor Vn is larger as shown by the solid line in FIG. 12, and the rising is sharper as the weighting factor Vn is smaller as shown by the broken line. That is to say, the comprehensive evaluation is influenced more as the weighting factor Vn is larger. In this embodiment, the weighting factor $V_1$ with respect to the out-of-focus blurring evaluation is 0.5, and the weighting factor $V_2$ with respect to the hand-movement blurring evaluation is 0.3 as described above. That is, more weighting is added to the out-of-focus blurring evaluation than to the hand-movement blurring evaluation. This is because the influence on the image quality of blurring due to the image being out-of-focus is generally greater than the influence on the image quality of blurring due to hand movement. Then, the CPU 41 calculates the comprehensive evaluation value by performing the calculation of Equation (6). In other words, based on the correlations shown in FIG. 13, the comprehensive evaluation value $q_{oV}$ is obtained based on the out-of-focus blurring evaluation factor $q_1$ and the hand-movement blurring evaluation factor $q_2$.

<Regarding Result Output>

Figure 14:
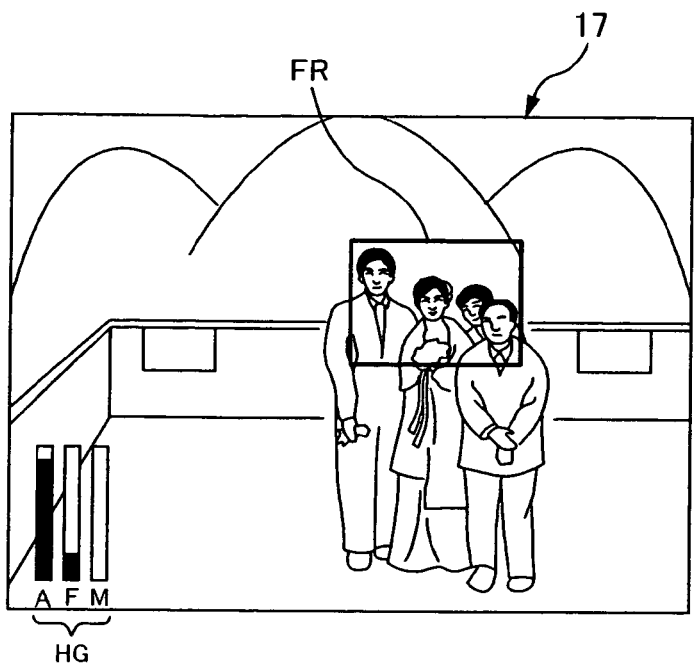
FIG. 14 is a diagram explaining a preview image displayed on an image display section based on a process of outputting a result.

Next, the result output (S26) is described. Herein, FIG. 14 is a diagram explaining a preview image displayed on the image display section 17 based on the process of outputting the result. In this process of outputting the result, a process is performed for displaying, on the image display section 17, a histogram HG indicating the out-of-focus blurring evaluation value C1, the hand-movement blurring evaluation value C2, and the comprehensive evaluation value $q_{oV}$ described above, and a frame FR indicating the evaluation range EV. That is to say, the CPU 41 creates image information of the histogram HG and image information of the frame FR based on information indicating the out-of-focus blurring evaluation value C1, the hand-movement blurring evaluation value C2, the comprehensive evaluation value $q_{oV}$, and the evaluation range EV. Then, the created image information is stored in the frame memory FM. Accordingly, as shown in FIG. 14, the histogram HG and the frame FR are superimposed on the preview image. In this embodiment, the histogram HG is disposed in the lower right region on the image display section 17. The histogram HG is constituted with a comprehensive evaluation value (A), an out-of-focus blurring evaluation value (F), and a hand-movement blurring evaluation value (M), and is updated in synchronization with these evaluation values. Furthermore, the frame FR indicating the evaluation range EV is also updated every time the evaluation range EV is updated. It should be noted that as for the frame FR, either normal display or flickering display may be employed. In addition, the frame FR may be indicated by a solid line or by a broken line.

When the histogram HG indicating the comprehensive evaluation value (A), the out-of-focus blurring evaluation value (F), and the hand-movement blurring evaluation value (M) is displayed on the preview image, a photographer can refer to these evaluation values when determining the timing for pressing the shutter release button 16. In other words, the photographer can confirm the state of blurring due to the image being out-of-focus and hand movement before pressing the shutter release button 16. The state of blurring due to the image being out-of-focus and hand movement is determined based on image information that has been formed by the digital image processing section 33. The image information is information that will be stored on the storage medium SM after undergoing a compressing process performed by the compression-expansion section 34. That is to say, the determination is performed based on the image information that is going to be stored. Thus, it is possible to process image information at a high precision. Furthermore, the photographer can easily see the evaluation range EV targeted for image evaluation by displaying the frame FR indicating the evaluation range EV on the preview image. Thus, the determination based on the obtained evaluation is facilitated. For example, it provides a guide as to what extent the obtained evaluation should be taken into consideration when making the determination.

Image Storing Process

Figure 15:
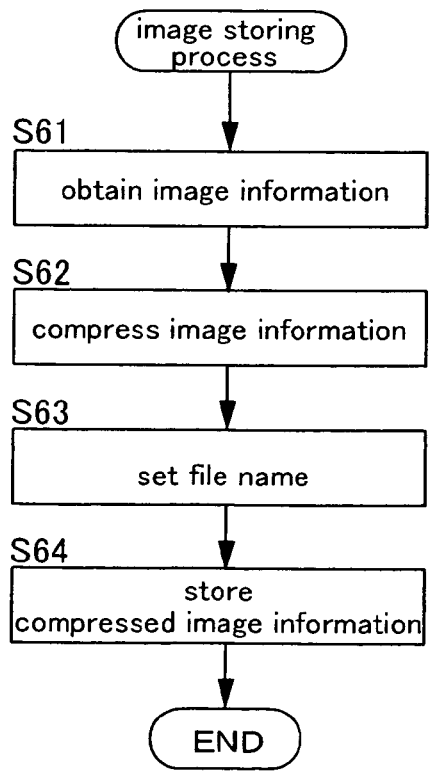
FIG. 15 is a flowchart for explaining an image storing process.

Next, the image storing process (S60) is described. Herein, FIG. 15 is a flowchart for explaining the image storing process.

In the image storing process, first, the image information is obtained (S61). More specifically, the CPU 41 controls the operation system OS and the sensor controller 44. Then, image information based on the determined focus and exposure conditions is created by the digital image processing section 33. The image information that has been created by the digital image processing section 33 is stored in the work memory 43.

After obtaining the image information, the image information is compressed (S62). The image information is compressed by the compression-expansion section 34. More specifically, processes such as discrete cosine transformation and Huffman coding are performed on the image information to compress the image. Then, the compressed image information that has been compressed by the compression-expansion section 34 is stored in the work memory 43.

After compressing the image information, a file name is set (S63). The file name is set in accordance with a predetermined standard (DCF (design rule for camera file system), for example).

Next, the compressed image information that has been created is stored on the storage medium SM (S64). Herein, the compressed image information that has been created in step S62 is stored on the storage medium SM using the file name that has been set in the previous step S63. Herein, as a format for storing the image information, Exif (exchangeable image file format) is used. Exif is a format for allowing various types of additional information during photographing to be stored together with compressed image information. Then, the above-described information of the out-of-focus blurring evaluation value C1, the hand-movement blurring evaluation value C2, the comprehensive evaluation value qv and the frame FR indicating the evaluation range EV is stored as additional information in Exif, together with the compressed image information.

Post-processing based on the evaluation result such as processes of printing the stored image information with a printing apparatus and correcting the image can be efficiently performed by storing the information of the evaluation values C1, C2, $q_{ov}$, and the frame FR together with the compressed image information. For example, it is possible to determine the correction degree with respect to blurring due to the image being out-of-focus and the correction degree with respect to blurring due to hand movement based on the out-of-focus blurring evaluation value and the hand-movement blurring evaluation value when printing the image information. Furthermore, it is also possible to assist a selection whether or not the image information is to be printed, based on the comprehensive evaluation value, in a printing apparatus such as a printer. For example, a message for confirming whether or not to print the image is displayed on a monitor screen etc. when the comprehensive evaluation is lower than a predetermined value. Thus, it is possible to prevent a trouble that an unnecessary image is printed.

Other Embodiments

The foregoing embodiment has been described on the digital camera 1. However, the above embodiment is for making understanding of the present invention easier, and does not limit interpretation of the present invention. The present invention can of course be altered and improved without departing from the gist thereof and includes equivalents. In particular, the embodiments mentioned below are also included in the present invention.

Any photographing device may be used as long as it converts an optical image of a captured object into electrical image information and stores the image information in a non-volatile memory. Thus, devices other than the digital camera 1 may be also used. For example, portable telephones, PDAs or digital video cameras may be also used. Furthermore, any shutter operating section may be used as long as it outputs a signal for causing the image information to be stored, and thus various types of operating sections other than the shutter release button 16 can be also used.

Furthermore, in the foregoing embodiment, image information is evaluated in a period during which the photographing mode is set, but the configuration is not limited to this. For example, it is also possible to evaluate an image during "other predetermined operations" such as an operation of half-pressing the shutter release button 16 and an operation of giving an instruction with the menu button 20 so as to perform an evaluation.

Furthermore, it is also possible to store the image information under a condition that the hand-movement blurring evaluation is equal to or higher than a predetermined valued. More specifically, when the shutter release button 16 is pressed to the deepest point, the CPU 41 evaluates the image information at that time point to obtain the hand-movement blurring evaluation value. Then, when the hand-movement blurring evaluation value is not greater than a predetermined value (that is, when the evaluation in terms of the blurring due to hand movement is better than a predetermined criterion), the image information is taken in. This configuration is effective, for example, when obtaining image information of a group photograph. That is to say, when a person moves, such movement will increase the hand-movement blurring evaluation value. Thus, it is possible to prevent a trouble that blurred image information is obtained.

The evaluation range EV is not limited to a partial range of the image information. For example, the entire image information may be taken as the evaluation range EV.

What is claimed is:

1. A method of evaluating image information comprising:
   (a) a step of converting an optical image of an object to be photographed into electrical image information;
   (b) a step of evaluating the electrical image information that has not yet been stored in a non-volatile memory, wherein the electrical image information is evaluated in a state in which a shutter operating section, on which a predetermined operation is performed when storing the electrical image information in the non-volatile memory, is not being subjected to the predetermined operation;
   (c) a step of creating an evaluation-result image information that indicates the evaluation result; and
   (d) a step of displaying an evaluation-related image based on the evaluation-result image information on an image display section together with a preview image based on the electrical image information that has not yet been stored in the non-volatile memory,
   wherein the evaluation-result images periodically displayed in a period that is longer than an update period in which the preview image is updated.

2. A method of evaluating image information according to claim 1, further comprising:
   a step of storing the evaluation result in the non-volatile memory,
   wherein the evaluation result is stored in the non-volatile memory in a state associated with the electrical image information.

3. A method of evaluating image information according to claim 2,
   wherein the evaluation result is associated with the electrical image information by being made into additional information in Exif.

4. A method of evaluating image information according to claim 1,
   wherein the electrical image information is evaluated in terms of a plurality of items, and a combined evaluation result is output based on the evaluation in terms of at least two items.

5. A method of evaluating image information according to claim 4,
   wherein the combined evaluation result is output based on the evaluation in terms of at least two items that are each weighted.

6. A method of evaluating image information according to claim 5,
   wherein the combined evaluation result is output based on the evaluation in terms of at least two items that are each weighted based on a Gaussian function.

7. A method of evaluating image information according to claim 1,
   wherein in the step of evaluating the electrical image information that has not yet been stored in the non-volatile memory, the evaluation with respect to the electrical image information is performed with respect to an evaluation range that is defined in a portion of the electrical image information.

8. A method of evaluating image information according to claim 7,
   wherein the evaluation range is defined based on a range having a largest number of edges, by dividing the electrical image information targeted for evaluation into a plurality of ranges and obtaining the number of edges in each of the divided ranges.

9. A method of evaluating image information according to claim 7, further comprising:
   a step of outputting information indicating the evaluation range.

10. A method of evaluating image information according to claim 9, further comprising:
    a step of displaying the evaluation range on an image display section,
    wherein the evaluation range is displayed together with the preview image based on the electrical image information that has not yet been stored in the non-volatile memory.

11. A method of evaluating image information according to claim 1,
    wherein in the step of evaluating the electrical image information that has not yet been stored in the non-volatile memory, the evaluation is made regarding blurring of the electrical image information due to hand movement.

12. A method of evaluating image information according to claim 1,
    wherein in the step of evaluating the electrical image information that has not yet been stored in the non-volatile memory, the evaluation is made regarding blurring of the electrical image information due to the image being out-of-focus.

13. A method of evaluating image information according to claim 1, further comprising:
    a step of storing the electrical image information in the non-volatile memory,
    wherein the electrical image information is stored in the non-volatile memory under a condition that the predetermined operation has been performed on the shutter operating section.

14. A method of evaluating image information according to claim 13,
    wherein in the step of storing the electrical image information in the non-volatile memory, the electrical image information is stored in the non-volatile memory under a condition that an evaluation regarding blurring of the electrical image information due to hand movement is equal to or better than a predetermined criterion.

15. A method of evaluating image information according to claim 13,
    wherein the predetermined operation on the shutter operating section is an operation of pressing the shutter operating section to a deepest point.

16. A method of evaluating image information according to claim 15,
    wherein in the step of evaluating the electrical image information that has not yet been stored in the non-volatile memory, the electrical image information is evaluated in a state in which the shutter operating section is pressed halfway in a depth direction.

17. A photographing device, comprising:
    (a) an optical/electrical converting section that converts an optical image of an object to be photographed into electrical image information;

(b) a shutter operating section on which a predetermined operation is performed when storing the electrical image information in a non-volatile memory; and (c) a controller that:

evaluates the electrical image information that has not yet been stored in the non-volatile memory in a state in which the predetermined operation is not being performed on the shutter operating section, creates an evaluation-result image information that indicates the evaluation result, and displays an evaluation-result image based on the evaluation-result image information on an image display section together with a preview image based on the electrical image information that has not yet been stored in the non-volatile memory, wherein the evaluation-result image is periodically displayed in a period that is longer than an update period in which the preview image is updated.

18. A computer readable storage medium having a program stored thereon, the program comprising:

a code that causes a photographing device to perform a process of converting an optical image of an object to be photographed into electrical image information;

a code that causes the photographing device to evaluate the electrical image information that has not yet been stored in a non-volatile memory in a state in which a shutter operating section, on which a predetermined operation is performed when storing the electrical image information in the non-volatile memory, is not being subjected to the predetermined operation;

a code that causes the photographing device to create an evaluation-result image information that indicates the evaluation result; and a code that causes the photographing device to display an evaluation-result image based on the evaluation-result image information on an image display section together with a preview image based on the electrical image information that has not yet been stored in the non-volatile memory, wherein the evaluation-result image is periodically displayed in a period that is longer than an update period in which the preview image is updated.

* * * * *